July 19, 1949.     G. H. FRITZINGER     2,476,719
ELECTRIC CURRENT GENERATOR
Filed July 5, 1947
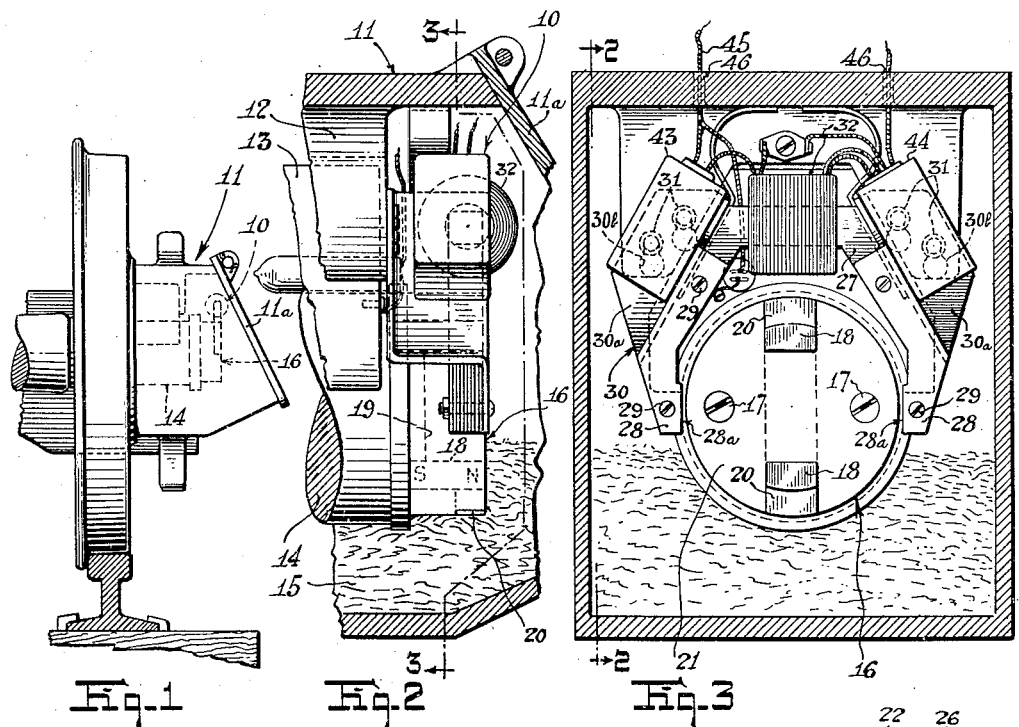
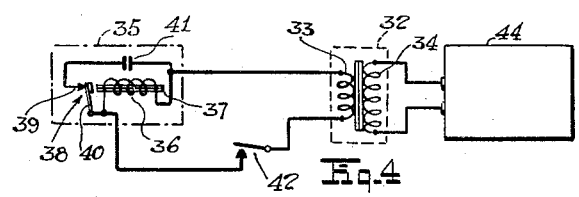
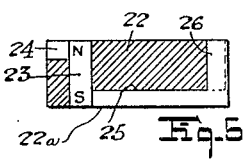
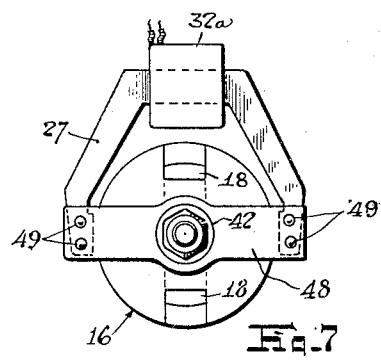
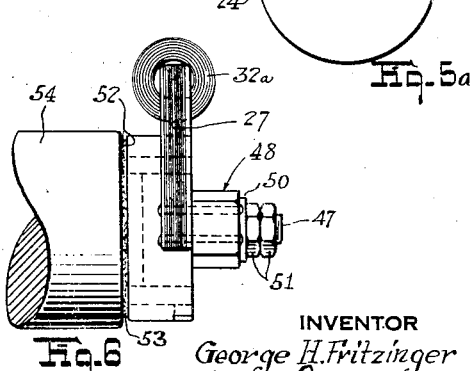
INVENTOR
George H. Fritzinger
BY Henry Lanahan
ATTORNEY Patented July 19, 1949

2,476,719

UNITED STATES PATENT OFFICE 2,476,719

ELECTRIC CURRENT GENERATOR

George H. Fritzinger, West Orange, N. J., assignor to Thomas A. Edison, Incorporated, West Orange, N. J., a corporation of New Jersey Application July 5, 1947, Serial No. 759,089

11 Claims. (Cl. 171—252)

This invention relates to novel electric current generators adapted particularly for easy attachment to existing machines and, especially, it relates to a novel form of permanent-magnet rotor for such generators which may be attached to or mounted on rotating structures of such machines, in close proximity thereto, notwithstanding that such structures are made of iron or other magnetic material.

This application is a continuation-in-part of my pending application Serial No. 567,076, filed December 7, 1944 and entitled Apparatus for detecting overheated bearings. In that application I have disclosed an apparatus which, upon an overheating of a journal bearing of a railway car, will produce a control action to set off a suitable alarm. This apparatus includes a magnetoelectric generator which is mounted in the journal housing of the railway car and which has a rotor adapted for direct mounting on the end face of an axle of the car. The subject matter of the present application which is a continuation of my aforementioned pending application, relates to the mechanical features of this generator.

It is to be understood that the rotor of the present invention is applicable not only to generators of the magnetoelectric type but also to alternating-current generators. In order to illustrate this broader aspect of my invention, I do herein show a unitary form of alternating-current generator employing such a rotor adapted to have a driving connection with a free end of an axle, shaft or other rotating member of a machine. This unitary generator may, for example, be a portable one useful particularly in speed-measuring apparatus, etc.

Objects of the present invention are to provide novel forms of electric current generators which are arranged so that they can be readily installed in and/or attached to different existing machines.

Another object is to provide a novel form of permanent-magnet rotor for such generators, which is arranged so that it may have a short axial length and yet be directly mounted on or attached to rotating structures of magnetic material.

It is another object to provide a novel and simple form of generator for use on or in connection with railway cars, which is adapted so that it can be readily installed in the journal housing.

Another object is to provide such a generator which is dependable for well-nigh unlimited service without need for maintenance or repair.

Another object is to provide such a generator having a rotor which can be mounted directly on the free end of the axle of a railway car so that no mechanical coupling is necessary which would undergo wear.

Another object is to provide a rotor for such generator which requires little space within the journal housing and which will not pick up any of the oil waste, etc. normally used in railway journal housings.

These and other objects and features of my invention will be apparent from the following description and the appended claims.

In the description of my invention reference is had to the accompanying drawings, of which:

Figure 1 is a view of a railway car wheel and journal housing showing a generator incorporated within the housing according to my invention;

Figure 2 is a partial vertical sectional view, to larger scale, taken through the journal housing on the line 2—2 of Figure 3 and showing the generator in side elevation;

Figure 3 is a sectional view taken substantially on the line 3—3 of Figure 2 and showing the generator in front elevation;

Figure 4 is a schematic drawing of the circuits and components of the magnetoelectric generator shown in the foregoing figures;

Figure 5 is a view with parts in section on the line 5—5 of Figure 5a showing a modified form of rotor according to the present invention;

Figure 5a is an end view of this modified form of rotor;

Figure 6 is a side elevational view of a unitary form of alternating-current generator employing a rotor according to my invention which has one end face thereof adapted for direct connection to a rotating axle, wheel or the like; and Figure 7 is an end view of this unitary form of generator.

In Figures 1, 2 and 3 there is shown a generator 10 of the magnetoelectric type mounted within a standard outboard journal housing 11 of a railway car. As is described in my pending application Serial No. 567,076, this magnetoelectric generator is controlled by thermostats in the respective bearings of the railway car so that the primary winding of the generator is interrupted only when one or another of the bearings has become overheated. Normally a relatively-low voltage is generated in the secondary winding but, when the primary winding is interrupted, there is generated a high-tension current in this secondary winding which is utilized for example to control a suitable element. For details as to this control system, reference may be had to this pending application. However, the mechanical features of this generator, with which this invention is particularly concerned, are herein next described in detail.

A standard journal housing for a railway car has within the top portion thereof a journal wedge 12 for supporting a bearing or brass 13 into which journals an axle 14 of the car. The space below the axle is filled usually with oil-soaked waste 15 which is inserted into and removed from the housing by way of a front opening covered by a hinged lid 11a. The space to the front of the axle and thereabove is normally unused and in this space there is mounted the magnetoelectric generator 10. By placing the generator thus within the housing 11, the generator is protected from the elements of the weather and from dirt and cinders. In order that the rotor of the generator will not obstruct the insertion and removal of the waste 15 into and out of the housing it is important that the axial length of the rotor be very short. Also, it is necessary that the rotor have a smooth contour so that it will not pick up the waste and churn it around in the journal housing. These desired objectives are attained by the present invention as will hereinafter appear.

The rotor of the generator 10 is mounted directly on the end face of the axle 14 and the journal for the axle is also the journal for the generator. Thus the generator is driven by the railway car without any mechanical coupling thereto that is subject to wear. To these ends, the magnetoelectric generator is provided with a permanent-magnet rotor 16 of a disk- or cylindrical shape which is held firmly to the end face of the axle by screws 17. This rotor comprises one or more permanent magnets 18—preferably two—which are made of one of the efficient permanent magnet materials composed of aluminum, nickel, cobalt and iron and known commercially as "Alnico." These magnets are placed intermediately between the center of the axle 14 and the outer periphery thereof, preferably nearer the periphery, as shown, and are positioned so that their magnetic axes are normal to the end face of the axle, and so that it is the south pole of one magnet and the north pole of the other that is at the end of the rotor adjacent to the axle 14. Bridging these ends of the magnets which are adjacent to the axle is a non-permanent magnetic member 19, and fitted to the outer poles of the magnets are radially-extending shoes 20 of non-permanent magnetic material such as soft iron. These pole shoes terminate on an arc about the center of the rotor. The magnets 18 and the members 19 and 20 are held in the assembled relation just described by being housed, preferably cast, in a cylindrical body 21 of non-magnetic material such as brass or aluminum. This rotor structure is formed thus in one complete cylindrical unit having a smooth end face and a smooth peripheral surface and with the pole faces of the shoes 20 being just flush with the peripheral surface. It is through the body 21 of this rotor structure that the aforementioned screws 17 pass to hold the rotor to the end face of the axle 14.

By placing the magnets and the rotor structure so that their magnetic axes are normal to the face of the rotor structure which is applied to the end of the axle 14, the axle—which is typically made of a magnetic material—does not provide any substantial magnetic shunt for the flux of the magnets. The bridging member 19 may lie, however, immediately adjacent to the end face of the axle since it is not a source of magnetomotive force.

Cooperating with the rotor 16 is a U-shaped field core 27. This field core is mounted, preferably detachably, in the upper front part of the housing 11. This field core has two field poles 28 spaced from the axle 14 in positions to cooperate with the pole shoes 20 of the rotor. Preferably, the field poles are positioned so that they have a common medial plane parallel with the horizontal and passing through the center of the axle 14. The faces 28a of these poles are preferably flat and positioned parallel with the vertical in order that the rotor may not come in contact with the field poles as the bearing 13 wears. The field core is made of laminated material held together by screws 29. These screws also serve to retain two mounting brackets 30 on the core. These brackets have turned-up flanges 30a provided with slots 30b for detachable connection with screw heads 31 secured to the wedge 12. In the central part of the field core there is an induction coil 32 having primary and secondary windings 33 and 34 schematically shown in Figure 4.

The circuit of the primary winding 33 includes a circuit breaker or interrupter 35 of an electrically-operable type which comprises a coil 36 wound on a magnetic core 37, and a switch 38 including a stationary contact 39 and a movable contact and armature 40. This armature is actuated electromagnetically to break the switch contacts recurrently upon energization of the field coil 36. A condenser 41 is connected in shunt with the field coil 36 and switch 38 to reduce arcing at the switch contacts. This interrupter 35 is to be so connected with the primary winding 33 that it will break recurrently the circuit of that winding when it is desired that the magneto produce a high-tension current. For example, the coil 36 and switch 38 of this interrupter may be connected in series with the primary winding 33, and the primary circuit may be completed by a control switch 42. When the control switch 42 is open the interrupter remains in an idle state and relatively-low voltages are produced in the secondary winding 34. However, when the switch 42 is closed the primary winding 33 will energize the coil 36 of the interrupter and the interrupter will in response thereto break recurrently the primary circuit to cause high-tension voltages to be produced in the secondary winding. As is described in my pending application aforementioned, the switch 42 is of a type responsive to an abnormal condition, say an overheated bearing as in the present application.

The interrupter 35 is mounted on the core 27 preferably in a hermetically-sealed container 43. Likewise the apparatus controlled by the secondary winding 34 may be mounted also on the core 27 as in a hermetically-sealed container 44, it being however herein unnecessary to describe this apparatus in the container 34. Switch leads, generally referred to as 45, connect the apparatus in these containers with the coil 32 and pass out of the journal housing by way of apertures 46 in the top wall thereof.

Since the permanent magnets of the rotor are made of the highly-efficient Alnico material, they may have a very short length relative to the square root of their cross sectional area. This permits the rotor 16 to have likewise a short axial length, a length typically of the order of only one or two inches. The diameter of the rotor structure is preferably equal substantially to that of the axle 14. However, if a rotor of longer axial dimension is desired, then in the present application the diameter of the rotor would be preferably reduced so that the rotor would not obstruct the space required for the insertion and removal of the waste 15 into and out of the journal housing 11. In such axially-longer rotor, preferably only one magnet is used as illustrated in Figures 5 and 5a. This rotor has a cylindrical body 22 of non-magnetic material within which is cast a bar magnet 23 at right angles to the mounting face 22a of the body. Preferably the magnet is positioned intermediately between the center axis of the rotor and the peripheral surface of the same, as shown. Extending radially from the outer pole end of the magnet is a pole shoe 24 terminating flush with the periphery of the body 22 and extending in an opposite direction from the inner pole of the magnet is a non-permanent magnetic bar 25, of an L shape, which terminates also at the peripheral surface of the body 22 and forms a second pole shoe 26 diametrically opposite the shoe 24.

It is to be understood that the rotor 16, or the modified form thereof just above described, of the present invention is not limited to generators of the magnetoelectric type but is applicable as well to alternating-current generators. In Figures 6 and 7 there is shown a unitary form of such alternating-current generator which, for example, may be a portable one adapted to be held in driving connection with a rotating element of a machine such as an axle, wheel or the like. This generator is, in the main, the same as that above described except that the field coil 32a thereof need have only one winding, the interrupter 35 is not included, and a bearing is provided in the generator for the rotor, the rotor 16 being shown by way of illustration. This rotor now is provided with a stub shaft 47 which is journalled in a cross bar 48 of non-magnetic material that is secured at its ends by rivets 49 to the pole end portions of the field core 27. The shaft 47 is held journalled on the bar 48 by a washer 50 and a pair of nuts 51 which are threaded onto the end portion of the shaft. Thus, the rotor is carried with the field core structure to form a unitary device.

An end face 52 of the rotor which is opposite the stub shaft may be flat and be surfaced with felt 53, or other suitable material, so that the rotor may have a frictional driving connection with the end face of an axle 54. No limitation to such flat frictional driving face is however intended for the driving connection may be made with any suitable rotating member by any suitable interlocking means if desired. However, since the present invention permits the permanent-magnet rotor to have a very short axial length and to be positioned immediately adjacent to the drive member therefor, notwithstanding that that member may be itself made of magnetic material, the use of a flat frictional driving face with the driving member will in many instances be preferred.

It will be understood that there will occur two flux reversals in the field core 27 for each revolution of the rotor and that there will be produced in the coil 32a one complete current cycle for each revolution of the rotor. By connecting the coil 32a to any suitable frequency-measuring device, not herein necessary to show, the speed of rotation of the axle 54 may be measured. It will be understood, however, that this application is merely an illustrative one since the generator may obviously have other uses.

The embodiments of my invention herein described are intended to be illustrative and not limitative of my invention, since the same is subject to changes and modifications without departure from the scope of my invention which I endeavor to express according to the following claims.

I claim:

1. A rotor for an electric current generator, having an end face adapted for driving connection with a free end of a rotating member, a permanent bar magnet at right angles to said end face, and pole shoes leading from the opposite ends of said magnet and terminating in pole faces spaced from the said end face in the direction of the axis of the rotor, said pole faces being at substantially equal distances from said axis.

2. A rotor for an electric current generator, comprising a substantially-cylindrical body of non-magnetic material, one end of said body being adapted for driving connection with the free end of a rotating member, a permanent magnet positioned within said body so that the magnetic axis thereof is substantially parallel to the axis of said body, and non-permanent magnetic members in said body terminating substantially flush with the surface of the body at the end thereof opposite said one end of the body, said magnetic members being respectively magnetically connected to the opposite poles of said permanent magnet.

3. A rotor for an electric current generator, having one end adapted for driving connection with a free end of a rotating member, comprising two permanent bar magnets positioned at distances from the central axis of the rotor with their magnetic axes substantially parallel to said axis and oppositely directed with respect to each other, pole shoes extending radially from the poles of said magnets opposite said one end of the rotor, said pole shoes terminating in pole faces at substantially-equal radial distances from said axis, and a bar of non-permanent magnetic material bridging the opposite poles of said magnets and lying adjacent to said one end of the rotor.

4. The rotor set forth in claim 3 wherein said magnets are positioned substantially closer to the periphery of said rotor than to said central axis.

5. An electric current generator comprising a rotor having a bearing at one end only and having the other end thereof adapted for driving connection with the free end of a rotating member, said rotor including a permanent magnet having the magnetic axis thereof substantially parallel to the axis of rotation of the rotor and having pole shoes terminating at equal radial distances from said axis and positioned at the end of the rotor opposite said one end thereof, said pole shoes being magnetically intercoupled by way of said magnet, a field core structure having poles positioned to cooperate with said rotor pole shoes, a coil on said core structure, and a support for said bearing secured to said core structure.

6. In a control system responsive to overheating of the journal bearing of a railway car: a magneto-electric generator including a magnetic field core having field poles, and a rotor cooperating with said field poles and mounted on the end of the axle which is associated with said bearing, said rotor including a permanent magnet positioned adjacent to said axle and having its magnetic axis at right angles to the end face thereof.

7. A signal-generating apparatus for detecting an overheated journal bearing of a railway car, comprising a magneto-electric generator, said generator including a field core structure having field poles spaced angularly around the axle which is associated with said bearing, and a cooperating rotor having a smooth cylindrical contour and mounted on the end face of said axle, said rotor comprising a permanent magnet and an encasing body of non-magnetic material, said magnet having its magnetic axis at right angles to the end face of said axle.

8. A signal-generating apparatus for detecting an overheated journal bearing of a railway car, comprising a magneto-electric generator, said generator including a field core structure having field poles spaced angularly around the axle which is associated with said bearing, and a cooperating rotor having a smooth cylindrical contour and mounted on the end face of said axle, said rotor comprising a pair of permanent magnets intermediately spaced between the center of said axle and the periphery thereof and positioned with their magnetic axes normal to said face, a magnetic member adjacent said face and intercoupling said magnets, pole shoe members for said magnets spaced from said end face and terminating on a circle concentric with said axle, and a body of non-magnetic material encasing the magnets and members of said rotor for holding the same in assembled relation.

9. In a control system responsive to overheating of the journal bearing of a railway car: a magneto-electric generator comprising a permanent magnet rotor mounted on an axle of said car and having diametrically opposite pole shoes; and a field core structure having a pair of poles positioned diametrically opposite the center of said axle, the common medial plane of said poles being substantially parallel with the horizontal, and said poles terminating in flat pole faces which are substantially parallel with the vertical.

10. In a control system responsive to overheating of the journal bearing of a railway car: a signal-generating apparatus and comprising a rotor fixedly mounted on an end of the car axle associated with said housing, a stator structure cooperating with said rotor, and means mounting said stator structure at the front of said bearing, said mounting means being detachable whereby said stator structure may be removed to permit replacement of said bearing.

11. A permanent-magnet rotor for a magneto-electric generator comprising a disk-shaped structure one end of which is adapted for mounting on the end face of an axle of a railway car, the other end of said structure and the periphery thereof having substantially smooth and continuous surfaces, a permanent magnet in said structure having its magnetic axis at right angles to said one end of the structure, diametrically-opposite magnet-pole shoes in said structure terminating at the surface of the structure and spaced from said one mounting end thereof, and said structure including non-magnetic means around said magnet and pole shoes to hold the magnet and shoes in assembled relation.

GEORGE H. FRITZINGER.

REFERENCES CITED

The following references are of record in the file of this patent:

UNITED STATES PATENTS

| Number | Name | Date |
|---|---|---|
| 1,948,828 | Reis | Feb. 27, 1934 |
| 2,381,211 | Crittenden | Aug. 7, 1945 |